United States Patent [19]
Krogmann

[11] Patent Number: 5,247,584
[45] Date of Patent: Sep. 21, 1993

[54] SIGNAL PROCESSING UNIT FOR CLASSIFYING OBJECTS ON THE BASIS OF SIGNALS FROM SENSORS

[75] Inventor: Uwe K. Krogmann, Überlingen, Fed. Rep. of Germany

[73] Assignee: Bodenseewerk Geratetechnik GmbH, Fed. Rep. of Germany

[21] Appl. No.: 817,903

[22] Filed: Jan. 9, 1992

[30] Foreign Application Priority Data

Jan. 10, 1991 [DE] Fed. Rep. of Germany ....... 4100500

[51] Int. Cl.$^5$ .............................................. G06R 9/62
[52] U.S. Cl. ...................................... 382/14; 382/15; 382/36; 395/21
[58] Field of Search ...................... 382/14, 15, 30, 34, 382/36; 395/20, 21, 94, 62

[56] References Cited

U.S. PATENT DOCUMENTS

| | | | |
|---|---|---|---|
| 4,025,920 | 5/1977 | Reitboeck et al. | 382/14 |
| 4,606,067 | 8/1986 | Ernst | 382/42 |
| 4,760,604 | 7/1988 | Cooper et al. | 382/15 |
| 4,876,731 | 10/1989 | Loris et al. | 382/40 |
| 5,054,093 | 10/1991 | Cooper et al. | 382/14 |
| 5,060,278 | 10/1991 | Fukumizu | 382/14 |
| 5,086,479 | 2/1992 | Takenaga et al. | 382/14 |
| 5,508,180 | 10/1992 | Khan | 382/14 |

FOREIGN PATENT DOCUMENTS

| | | |
|---|---|---|
| 3237137 | 9/1983 | Fed. Rep. of Germany. |
| 3907843 | 9/1989 | Fed. Rep. of Germany. |
| 4012278 | 10/1990 | Fed. Rep. of Germany. |
| 3922129 | 11/1990 | Fed. Rep. of Germany. |
| WO90/16038 | 12/1990 | PCT Int'l Appl. . |

OTHER PUBLICATIONS

Article entitled "Werden Neuronale Netze Langsam Praxisreif?" by Manfred Domke, online, Feb., 1990.
Article entitled "Dumb Intelligence" by Wilfred James, *Electronics World + Wireless World*, Mar., 1990.
Article entitled "Tapping into the Knowledge Power of Expert Systems" by Ben Finkel, *Computer Design*, Mar. 15, 1986.
Paper entitled "CMAC: An Associative Neural Network Alternative to Backpropagation", by W. Thomas Miller, III, et al., *Proceedings of the IEEE*, Oct., 1990.

*Primary Examiner*—Joseph Mancuso
*Attorney, Agent, or Firm*—Dougherty, Hessin, Beavers & Gilbert

[57] ABSTRACT

In a signal processing arrangement for classifying objects on the basis of signals from a plurality of different sensors each of the signals from the sensors is applied to a pair of neural networks. One neural network of each pair processes predetermined characteristics of the object and the other neural network processes movement or special data of the object such that these networks provide detection, identification and movement information specific for the sensors. Feature vectors formed from this information specific for the sensors are applied to a neural network for determining the associations of the identification and movement information. The information obtained by this network is applied together with the feature vectors to a network for identifying and classifying the object. The information from the association and identification networks, respectively, are supplied together with the information specific for the sensors to an expert system which, by using further knowledge about data and facts of the potential objects, makes final decisions and conclusions for identification.

10 Claims, 1 Drawing Sheet

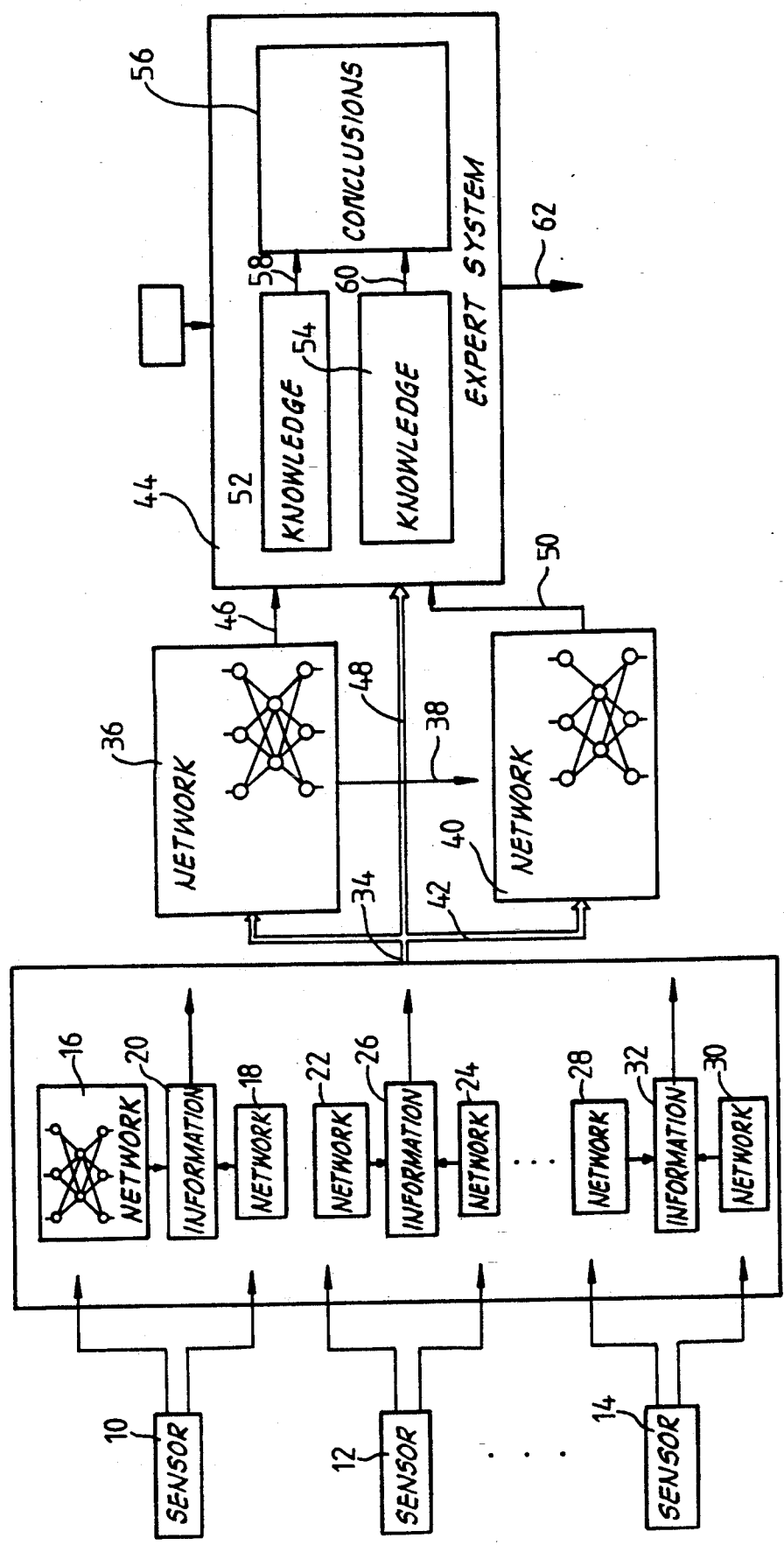

SIGNAL PROCESSING UNIT FOR CLASSIFYING OBJECTS ON THE BASIS OF SIGNALS FROM SENSORS

TECHNICAL FIELD

The invention relates to a signal processing unit for classifying objects on the basis of signals applied thereto from a plurality of different sensors.

The problem is identifying and classifying an object on the basis of three signals from different sensors. Each of the sensors provides information about a different characteristic of the object. From this information it shall be determined to which class the object belongs. The sensors can be picture-detecting sensors which provide information about the shape of the object. However, such sensors can also supply information about the distribution of a measuring quantity, e.g. the temperature or the reflection factor, over the surface of the object. The sensors can operate in different wavelength ranges, for example with radar, with laser beams or with infrared radiation.

Seeker heads which have to detect certain selected targets constitute one application of such identification and classification techniques. With such seeker heads, identification of the targets is required, in particular, when targets outside the visual range have to be approached such that an initial alignment of the seeker head to a certain target is not possible.

BACKGROUND ART

When using the conventional methods of pattern recognition and classification alone, it is difficult to set up the identification declarations with as exact error presentation (confidence statement) as possible, such that, with a higher degree of signal processing, this information can be combined as good as possible with regard to contradictional and uncertain contents of the information from individual sensors. In particular, the prior art methods involve long solution times for processing the multiple identification data, unavoidable errors and uncertainty of the data describing the target attributes. Furthermore, an error tolerance is required which cannot be achieved with the known techniques.

A particular problem is that the advanced sensor technology supplies increasingly comprehensive quantities of rough and also preprocessed sensor data which have to be processed in real time. In classical signal processing techniques, this leads to higher and higher requirements with regard to the transfer rate. This requires large computers which cannot be used in many applications.

Computers in the form of neural networks are known. Such neural networks offer the following advantages: They quickly reach satisfying solutions. They show a self-organized learning based on training with reference to examples. The learned rules and facts are stored in the weight factors of the processor element connections (long-time memory). Thereby, the wearisome communication between memory and processor elements necessary in conventional solutions is not necessary in neural networks. Parallel-redundant hardware realisation results in a highly failuretolerant mode of operation.

U.S. Pat. No. 4,876,731 deals with the recognition of patterns, in particular the reading of amounts on checks. The pattern is input as a pixel matrix. Signal processing is effected by means of a neural network. U.S. Pat. No. 4,876,731 also describes the use of an expert system in conjunction with object recognition for providing knowledge regarding, for example, to the laws of physics or to the type of the scene. In the embodiment of U.S. Pat. No. 4,876,731, knowledge about the amounts to be paid by the check are used to support identification of the pattern.

WO 90/16,038 describes a two-layer neural network which compares the position of a moving object, such as a rocket, with a predicted state.

German patent document 39 07 843 describes an expert system; German patent document 39 22 129 describes the setup of a neural computer.

DISCLOSURE OF INVENTION

It is the object of the invention to provide an optimum structure for the signal processing for classifying objects on the basis of the signals from a plurality of sensors.

According to the invention, the signal processing unit comprises sensor signal input means for sensors from a plurality of sensors responding to objects to be classified, and pairs of first neural networks, each of said pairs being associated with one of said signal sensor input means and arranged to receive information from said one of said sensor input means. A first neural network of each pair is trained to process a predetermined characteristic of said object to be classified. A second neural network of each pair is trained to process movement or special data. Said first neural networks, provide feature vectors composed of detection and identification information specific for the repective ones of said sensors. Said second neural networks provide feature vectors composed of movement information specific for the respective ones of said sensors. Said feature vectors are applied to a third neural network. Said third neural network is adapted and trained to determine the associations of said feature vectors of said detection, identification and movement information to provide association information. Furthermore there are identifying and classifying means for identifying and classifying said object. Said identifying and classifying means are arranged to receive said association information and to provide final identification information.

In a preferred embodiment, said identifying and classifying means comprise a fourth neural network, to which said association information and said feature vectors are applied. Said fourth neural network is adapted and trained to identify and classify said object to provide identification and classification information.

Preferably said identifying and classifying means further comprise an expert system means. Said expert system means has stored therein knowledge about data and facts relating to potential objects. Said expert system is arranged to receive said association information from said third neural network and said identification and classification information from said fourth neural network to provide therefrom and from said knowledge said final information.

Neural networks are used which avoid the problems of the classical computers having memory and processor. Better efficiency data of detection, identification and classification with regard to the confidence intervals and operative ranges (distances) result by superposition of the sensor data on a low level. The complexity and the delay times of the signal processing are reduced by using neural networks already in the sensor signal processing.

An embodiment of the invention will now be described in greater detail with reference to the accompanying drawing.

BRIEF DESCRIPTION OF THE DRAWING

The FIGURE shows a block diagram of a signal processing arrangement for classifying objects on the basis of signals from a plurality of different sensors.

PREFERRED EMBODIMENT OF THE INVENTION

Numerals 10,12, and 14 designate three sensors which operate with radar, laser beams and infrared radiation. As indicated, further sensors different from the sensors 10,12 and 14 can be provided. The sensors 10,12, and 14 are image-detecting sensors. In the respective wavelength range they supply an image of the field of view with the object to be recognized. In this way, the sensors detect not only the contours of the object but different characteristics such as the temperature distribution over the surface of the object, the reflection factor for radar, radiation and its distribution or the distribution of the reflection factor for the laser beams. Also the movement of the object in the field of view is dected: For exemple, it is determined whether the object moves quickly or slowly or not at all, rectilinearly or on a curved path. All of these characteristics can be used for identifying and classifying the object.

For sensor signal processing, a neural network 16 and a neural network 18 are asdsociated with the sensor 10 operating with radar. The neural network 16 processes image information. The neural network 18 processes spectral information. "Multi-layer" networks which are designed as "feedforward" networks are used in order to permit rotations, displacements and scale differences. Feedbacks can be provided within the multi-layer networks. The multi-layer networks can be trained "off-line" for detection and identification of the potential targets. In connection with algorithmic signal processing, these neural networks provide detection, identification and movement information specific for the sensor 10 in question. This information is illustrated by block 20.

In a corresponding way, a neural network 22 and a neural network 24 are associated with the sensor 12 operating with a laser beam. The neural network 22 processes image information. The neural network 24 processes spectral information. Again, detection, identification and movement information specific for the sensor 12 results. This information is illustrated by block 26.

Furthermore, a neural network 28 and a neural network 30 are associated with the sensor 14 operating with infrared radiation. The neural network 28 processes image information. The neural network 30 processes spectral information. Again, detection, identification and movement information specific for the sensor 14 results. This information is illustrated by block 32.

The superposition of the sensor data is effected on the next level. At first, these data are combined to feature vectors. The feature vectors are symbolized by a bus 34 in the block diagram. These feature vectors are supplied to a neural network 36 for determining the associations of the identification information and data.

The information thus obtained from the neural network 36 is supplied to a neural network 40 as illustrated by arrow 38. Furthermore, the neural network 40 receives the feature vectors as indicated by bus 42. The neural network 40 carries out the actual target identification and classification.

Numeral 44 designates an expert system. The expert system 44 receives the output information from the neural network 36, the "association" network. This output information is called "association information". This is illustrated by arrow 46. Furthermore, the expert system 44 receives the feature vectors. This is symbolized by a bus 48. Finally, the expert system 44 receives the output information from the neural network 40, the "identification" network, This is illustrated by the connection 50. The expert system 44 contains further knowledge about data and facts of potential objects (or targets). This knowledge is illustrated by block 52. Furthermore, the expert system contains knowledge about the "world section" in which the event takes place. This is symbolized by block 54. Due to this knowledge, the expert system 44 makes the final decision. The expert system also makes conclusions for identification of the object. This is illustrated by block 56 to which the outputs 58 and 60, respectively, of the blocks 52 and 54, respectively, are applied. As illustrated by arrow 62, the expert system provides identification of the object or the target based on the signals from a plurality of sensors, and confidence intervals which are indicative of the reliability of the identification.

I claim:

1. A signal processing unit for classifying objects comprising:

a plurality of sensors responding to different physical quantities detected at an object to be classified and providing sensor information, pairs of first and second neural networks, each of said pairs being associated with a respective one of said sensors and arranged to receive said information from said one of said sensors, said first neural network of each pair being adapted and trained to process image information of said object to be classified, said second neural network of each pair being adapted and trained to process spectral information of said object to be classified, said first neural networks providing detection, identification and movement information derived from said image information and specific for the respective one of said sensors, said second neural networks providing detection, identification and movement information derived from said spectral information and specific for the respective ones of said sensors, said information, combined, representing a feature vector, a third neural network to which said feature vector is applied, said third neural network being adapted and trained to determine the associations of said feature vector of said detection, identification and movement information, to provide association information, and identifying and classifying means for identifying and classifying said object, said identifying and classifying means being arranged to receive said association information and to provide final identification information.

2. A signal processing unit as claimed in claim 1, wherein said identifying and classifying means is arranged to receive also said feature vector.

3. A signal processing unit as claimed in claim 1, wherein said identifying and classifying means comprise a fourth neural network, to which said association information is applied, said fourth neural network being trained to identify and classify said object to provide identification and classification information.

4. A signal processing unit as claimed in claim 3, wherein said fourth neural network is arranged to receive also said feature vector.

5. A signal processing unit as claimed in claim 3, and further comprising an expert system means, said expert system means having stored therein knowledge about data and facts relating to potential objects, said expert system being arranged to receive said association information from said third neural network and said identification and classification information from said fourth neural network to provide therefrom and from said knowledge said final identification information.

6. A signal processing unit as claimed in claim 1, wherein said sensors comprise a radar sensor, a laser sensor and an infrared sensor.

7. A signal processing unit as claimed in claim 1, wherein said sensors are adapted to provide picture information of said object.

8. A signal processing unit as claimed in claim 7, wherein a first neural network associated with one of said sensors processes image information to provide detection and identification information specific for said one sensor.

9. A signal processing unit as claimed in claim 1, wherein said neural networks are multi-layer feedforward networks.

10. A signal processing unit for classifying objects comprising:
  a plurality of sensors responding to different physical quantities detected at an object to be classified and providing sensor information,
  pairs of first and second multi-layer feedforward neural networks, each of said pairs being associated with a respective one of said sensors and arranged to receive said information from said one of said sensors,
  said first neural network of each pair being adapted and trained to process image information of said object to be classified, said second neural network of each pair being adapted and trained to process spectral information of said object to be classified for the detection and identification of potential targets,
  said first neural networks providing detection, identification and movement information derived from said image information and specific for the respective ones of said sensors,
  said second neural networks providing detection, identification and movement information derived from said spectral information and specific for the respective ones of said sensors, said information, combined, representing a feature vector,
  a third neural network to which said feature vector is applied, said third neural network being adapted and trained to determine the associations of said feature vector of said detection, identification and movement information, to provide association information,
  a fourth neural network, to which said association information and said feature vector are applied, said fourth neural network being trained to identify and classify said object to provide identification and classification information, and
  an expert system means, said expert system means having stored therein knowledge about data and facts relating to potential objects, said expert system means being arranged to receive said association information from said third neural network and said identification and classification information from said fourth neural network to provide therefrom and from said knowledge final identification information.

* * * * *